US012412982B2

(12) United States Patent
Abraham et al.

(10) Patent No.: US 12,412,982 B2
(45) Date of Patent: Sep. 9, 2025

(54) PLANAR INVERTED-F ANTENNA SUPPORTING COMMUNICATION OF WIRELESS BROADBAND SIGNALS AND LOCATION SIGNALS WITHIN A SINGLE ELEMENT

(71) Applicant: PetPace LTD., Shefayim (IL)

(72) Inventors: Lior Abraham, Shefayim (IL); Asaf Dagan, Shefayim (IL); Oren Elimelech, Shefayim (IL)

(73) Assignee: PetPace LTD, Shefayim (IL)

( * ) Notice: Subject to any disclaimer, the term of this patent is extended or adjusted under 35 U.S.C. 154(b) by 248 days.

(21) Appl. No.: 18/138,746

(22) Filed: Apr. 25, 2023

(65) Prior Publication Data

US 2024/0364011 A1 Oct. 31, 2024

(51) Int. Cl.
*H01Q 9/04* (2006.01)

(52) U.S. Cl.
CPC ......... *H01Q 9/0414* (2013.01); *H01Q 9/0421* (2013.01)

(58) Field of Classification Search
CPC .... H01Q 9/0414; H01Q 9/0421; H01Q 1/243; H01Q 5/371
See application file for complete search history.

(56) References Cited

U.S. PATENT DOCUMENTS

2004/0085244 A1 * 5/2004 Kadambi ............... H01Q 5/357
343/700 MS

* cited by examiner

*Primary Examiner* — Dieu Hien T Duong
(74) *Attorney, Agent, or Firm* — Rivka Friedman

(57) ABSTRACT

A planar inverted-F antenna has a first planar radiating element, a first feed element electrically connected to a first area of the first planar radiating element, and a first ground element electrically connected to a second area of the first planar radiating element. The first planar radiating element is a multi-band radiating element configured to operate at a plurality of frequency bands including at least one frequency band at which location signals are communicated and multiple frequency bands at which wireless broadband signals are communicated. The first planar radiating element supports, within a single radiating element, communication of location signals and communication of wireless broadband signals. In certain embodiments, the first planar radiating element has a first substantially L-shaped region, a second substantially L-shaped region inverted with respect to, and forming a continuation of, the first region, and a third region forming a continuation of the first or second region.

20 Claims, 14 Drawing Sheets

PLANAR INVERTED-F ANTENNA SUPPORTING COMMUNICATION OF WIRELESS BROADBAND SIGNALS AND LOCATION SIGNALS WITHIN A SINGLE ELEMENT

TECHNICAL FIELD

The present invention relates to a planar inverted-F antenna (PIFA), and in particular a PIFA that supports communication of wireless broadband signals and location signals within a single radiating element of the PIFA.

BACKGROUND OF THE INVENTION

Planar inverted-F antennas (PIFAs) are well known in the art, and are widely used in compact wireless devices where space is at a premium. In order to support communication of wireless broadband signals and location-based signals, such as signals from GPS satellites, conventional PIFA architectures utilize multiple radiating elements, which requires a larger footprint.

SUMMARY OF THE INVENTION

The present invention is a multi-band planar inverted-F antenna (PIFA) that supports communication of wireless broadband signals and location signals within a single radiating element of the PIFA.

The support of wireless broadband signals and location signals within a single radiating element according to the embodiments of the present invention provides several advantages over conventional PIFA designs, including significant reduction in the footprint of the radiating element, which can also free additional area that can be utilized for which additional wireless broadband operational frequency bands.

According to the teachings of an embodiment of the present invention, there is provided a planar inverted-F antenna. The planar inverted-F antenna comprises: a first planar radiating element, the first planar radiating element being a multi-band radiating element configured to operate at a plurality of frequency bands including at least one frequency band at which location signals are communicated and multiple frequency bands at which wireless broadband signals are communicated so as to support, within a single radiating element, communication of location signals and communication of wireless broadband signals; a first feed element electrically connected to a first area of the first planar radiating element; and a first ground element electrically connected to a second area of the first planar radiating element.

Optionally, the first planar radiating element includes: a first region, that is a substantially L-shaped region, a second region, that is a substantially L-shaped region inverted with respect to, and forming a continuation of, the first region, and a third region that forms a continuation of the first region or the second region, the first area to which the first feed element is electrically connected is located in a first area of the first region, and the second area to which the first ground element is electrically connected is located in a second area of the first region.

Optionally, the third region is a substantially L-shaped region that forms a continuation of the second region at a side of a lower portion of the second region such that the third region and a portion of the second region together form a tightly meandered region.

Optionally, the third region is a substantially L-shaped region that forms a continuation of the second region at a side of a lower portion of the second region such that the third region and a portion of the second region together form a substantially U-shaped region.

Optionally, the third region is a rectangular region that forms a continuation of the first region at a side of a lower portion of the first region.

Optionally, the third region intersects with an extension of a lower portion of the second region.

Optionally, the first region includes a slot extending inward from a side of the first region, and the first area of the first region and the second area of the first region are on opposite sides of the slot.

Optionally, the location signals are communicated by a global positioning satellite system.

Optionally, the wireless broadband signals are Long-Term Evolution standard compliant signals.

Optionally, the first planar radiating element has a measurement along a first dimension of no more than 35 millimeters and a measurement along a second dimension of no more than 23 millimeters.

Optionally, the planar inverted-F antenna further comprises: a second planar radiating element electrically connected to the first planar radiating element, the second planar radiating element formed as an L-shaped region and laterally spaced apart from the second region of the first planar radiating element, the second planar radiating element configured to operate at one or more frequency bands at which short-range wireless signals are communicated so as to support, within a second single element, communication of short-range wireless signals; a second ground element electrically connected to a first area of the second planar radiating element; and a second feed element electrically connected to a second area of the second planar radiating element.

Optionally, the second planar radiating element is further configured to operate at one or more frequency bands at which wireless local area network signals are communicated so as to support, within the second single element, communication of wireless local area network signals.

There is also provided according to an embodiment of the teachings of the present invention a planar inverted-F antenna. The planar inverted-F antenna comprises: a first planar radiating element including: a first region, that is a substantially L-shaped region, a second region, that is a substantially L-shaped region inverted with respect to, and forming a continuation of, the first region, and a third region, that is a substantially L-shaped region, and that forms a continuation of the second region at a side of a lower portion of the second region such that the third region and the lower portion of the second region together form a tightly meandered and substantially U-shaped region, the first planar radiating element being a multi-band radiating element configured to operate at a plurality of frequency bands including at least one frequency band at which location signals are communicated and multiple frequency bands at which wireless broadband signals are communicated so as to support, within a single element, communication of location signals and communication of wireless broadband signals; a first feed element electrically connected to a first area of the first region; and a first ground element electrically connected to a second area of the first region.

There is also provided according to an embodiment of the teachings of the present invention a planar inverted-F antenna. The planar inverted-F antenna comprises: a first planar radiating element including: a first region, that is a substantially L-shaped region, a second region, that is a substantially L-shaped region inverted with respect to, and forming a continuation of, the first region, and a third region, that is a rectangular region, and that forms a continuation of the first region at a side of a lower portion of the first region such that the third region intersects with an extension of a lower portion of the second region, the first planar radiating element being a multi-band radiating element configured to operate at a plurality of frequency bands including at least one frequency band at which location signals are communicated and multiple frequency bands at which wireless broadband signals are communicated so as to support, within a single element, communication of location signals and communication of wireless broadband signals; a first feed element electrically connected to a first area of the first region; and a first ground element electrically connected to a second area of the first region.

The PIFA according to the embodiments of the present invention occupies a small footprint, making it particularly suitable for use with compact electronic devices that require both wireless broadband connectivity and location services provided by the reception of location signals. As will become apparent from the following description, the PIFA according to the embodiments of the present invention provides a novel compact antenna that supports communication of wireless broadband signals in most if not all major bands used by major telecommunication companies, for example notably in the United States and Europe, and supports communication of location signals that alone or in combination with the communication of wireless broadband signals supports location services. The support of communication of both wireless broadband signals and location signals in a novel compact antenna enables deployment of the antenna in compact electronic devices, including wearable devices, allowing the use of wearable devices on subjects, including animals such as dogs, cats, and other pet animals or non-pet animals, like never before.

Within the context of this document, the term "wireless broadband signals" generally refers to communications signals that are communicated according to wireless broadband standards to provide high-speed wireless network access to fixed and mobile devices over a wide area according to one or more communication standards, including, cellular/mobile communication standards such as long-term evolution (LTE), fourth generation broadband cellular network (4G), fifth generation broadband cellular network (5G), and beyond.

Within the context of this document, the term "location signals" generally refers to signals that are communicated from satellite-based location systems having one or more satellites that are part of one or more global positioning satellite constellation systems, to electronic devices to provide location and/or position data and information to such electronic devices, which can be used by receivers of the electronic devices to calculate location of the electronic device. Examples of satellite-based location systems include, for example, GNSS, GPS, GLONASS, Galileo, and the like.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
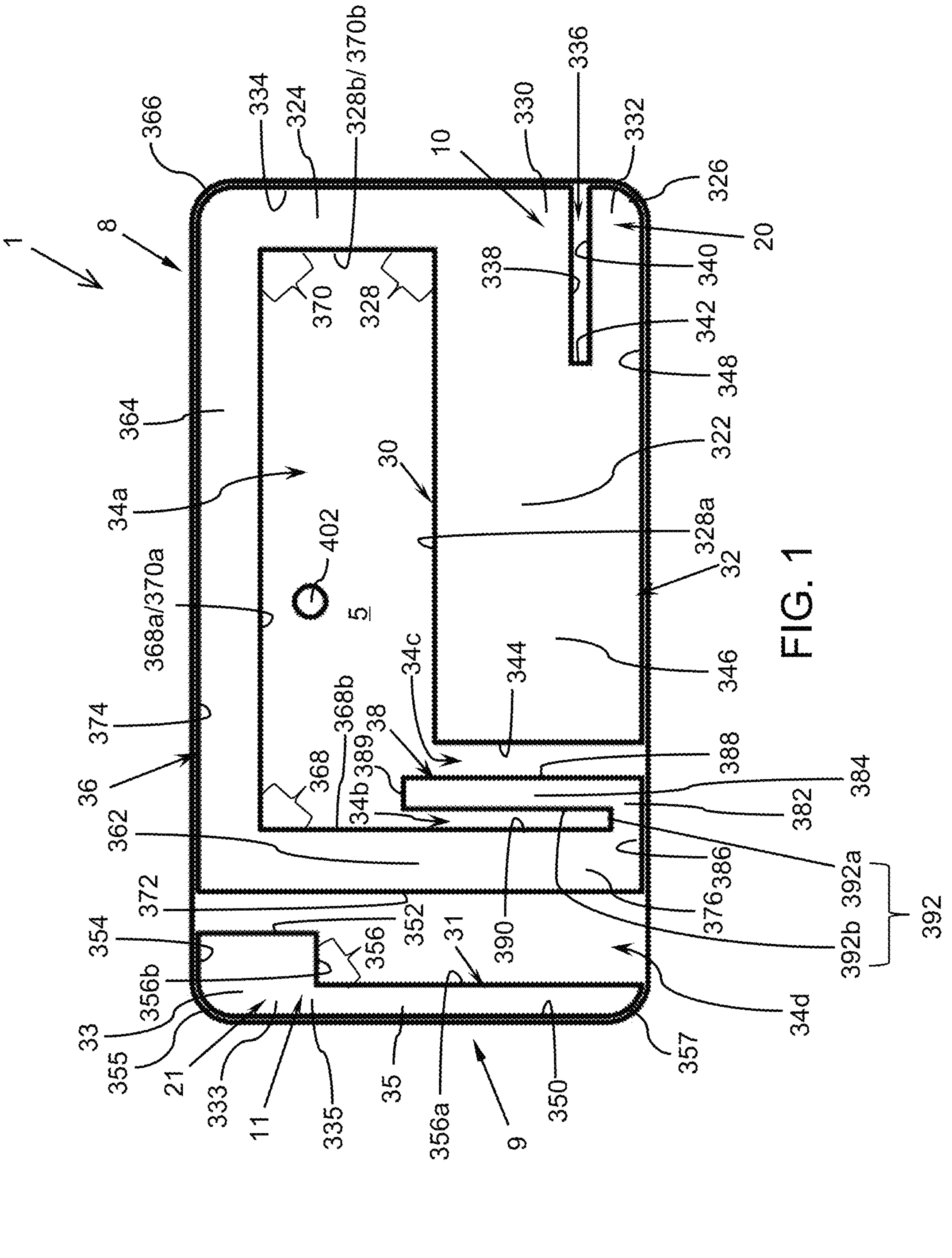
FIG. 1 is a top view of a planar inverted-F antenna having a first antenna unit that supports communication of location signals and communication of wireless broadband signals and a second antenna unit that supports communication of short-range wireless signals and wireless local area network signals, according to an embodiment of the present invention.

The present invention is a multi-band planar inverted-F antenna (PIFA) that supports communication of wireless broadband signals and location signals within a single radiating element of the PIFA.

The principles and operation of the multi-band PIFA according to present invention may be better understood with reference to the drawings accompanying the description.

As mentioned above, the PIFA according to the embodiments of the present invention occupies a small footprint, making it particularly suitable for use with compact electronic devices that require both wireless broadband connectivity and location services provided by the reception of location signals (e.g., global positioning system (GPS) signals) and/or wireless broadband signals. Examples of such electronic devices include, but are not limited to, wearable devices (such as, for example, fitness watches, smart watches, glasses (e.g., augmented reality (AR) glasses), foot-worn devices, etc.), smart tags, and location finders. As will be discussed in subsequent sections of the present disclosure, in one exemplary embodiment, the PIFA according to the present invention is deployed as part of a wearable animal collar device that collects and monitors bioparameters (indicative of vital signs and other physiological and behavioral metrics) of an animal (such as, but not exclusively limited to, a pet animal, for example a dog, cat, etc.) wearing the collar device.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions, such as, for example, upper and lower, front and back, and the like. These directional references are exemplary only to illustrate the invention and the embodiments thereof.

Figure 2:
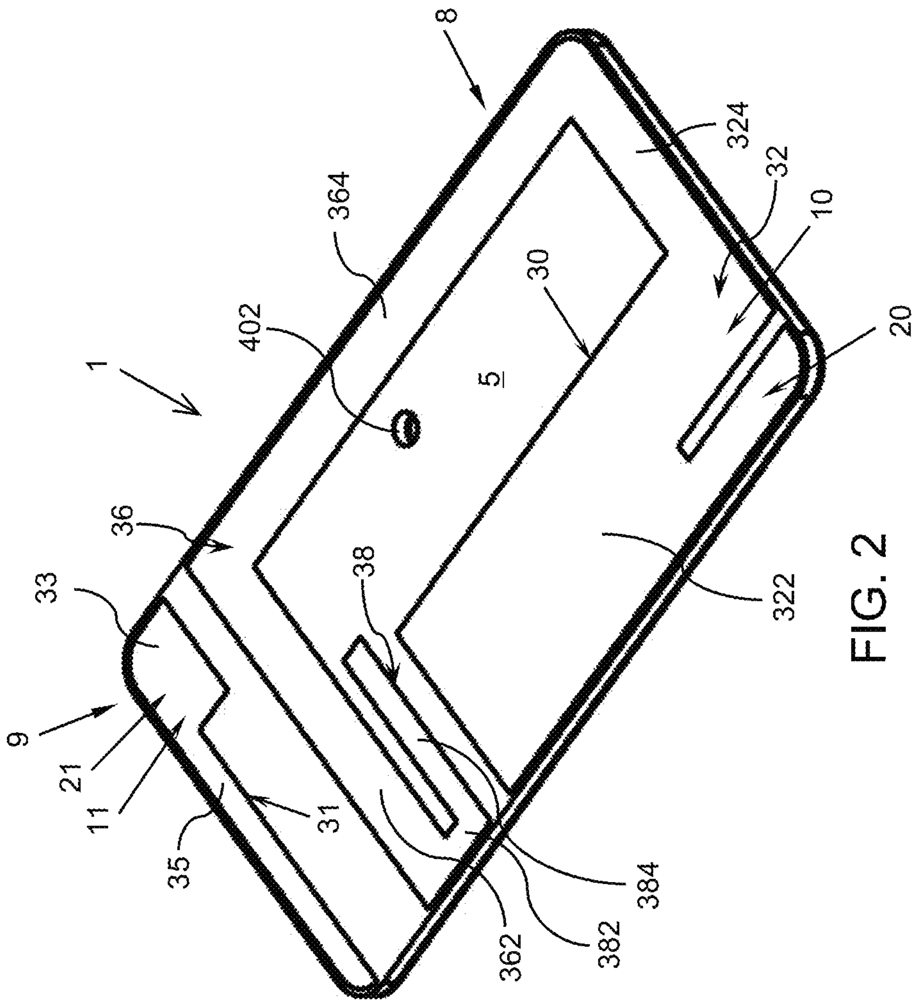
FIG. 2 is an isometric view of the planar inverted-F antenna of FIG. 1.
Figure 3:
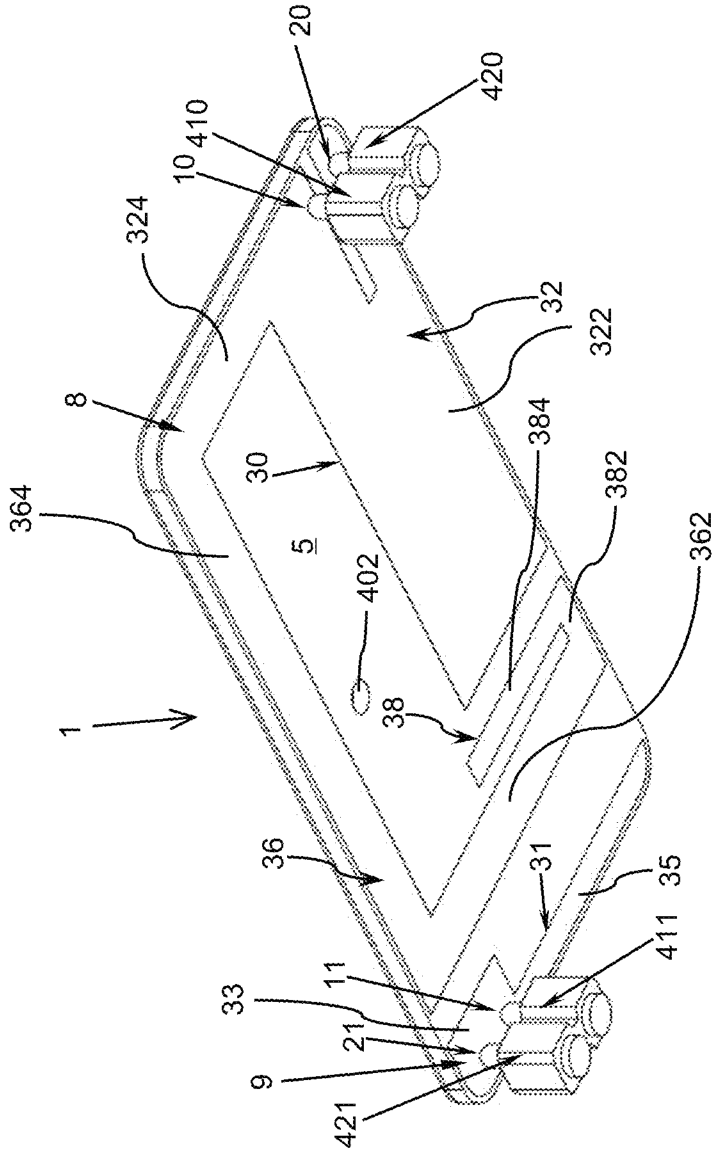
FIG. 3 is another isometric view of the planar inverted-F antenna of FIG. 1, showing electrical connectors for the ground elements and the feed elements of the planar inverted-F antenna.

Referring now to the drawings, FIGS. 1-3 illustrate various views of a multi-band PIFA, generally designated 1, constructed and operative according to a non-limiting embodiment of the present invention. Generally speaking, the PIFA 1 includes an antenna unit 8 that supports communication of location signals and communication of wireless broadband signals. In the illustrated embodiment, the PIFA 1 also includes a second antenna unit 9 that supports communication of short-range wireless signals, in particular Bluetooth (BT) standard compliant signals, and preferably also supports communication of wireless local area network signals (colloquially referred to as "Wi-Fi" or "WLAN" signals). It is noted that in certain situations, only signals for wireless broadband and location may be desired, therefore, in certain embodiments, the antenna unit 9 may be excluded from the PIFA 1.

Figure 7:
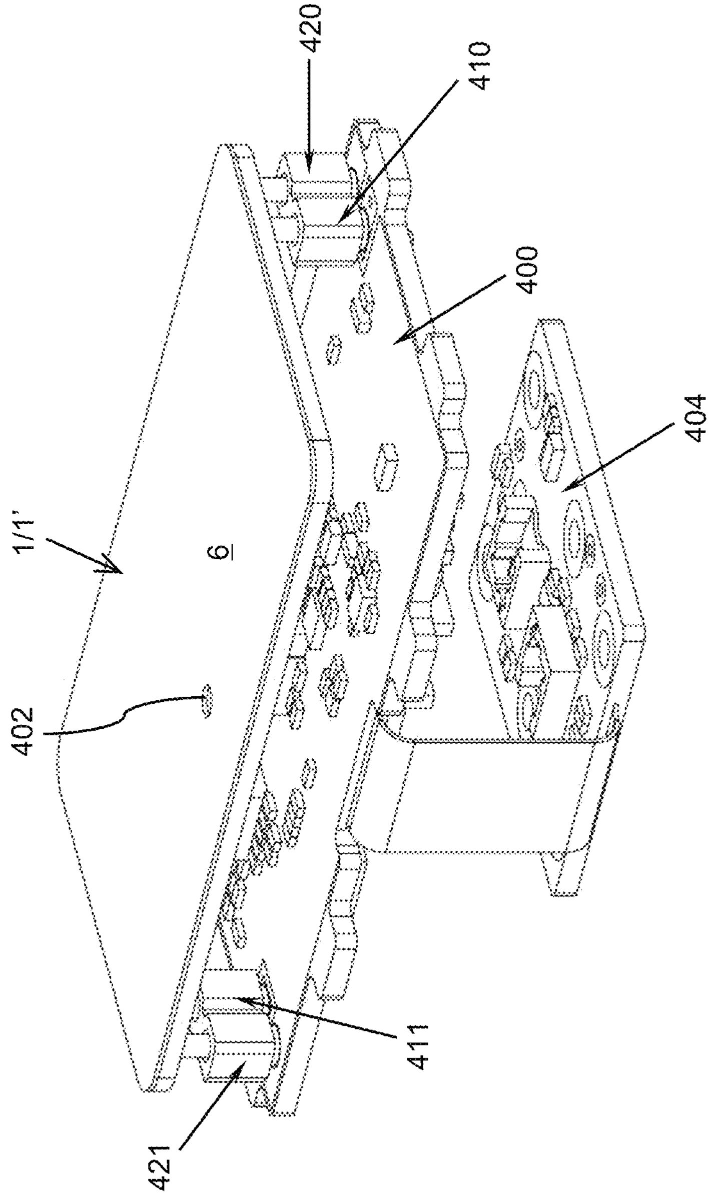
FIG. 7 is an isometric view of the planar inverted-F antenna of FIG. 1 or FIG. 4, showing the PIFA electrically connected to a ground plane via electrical connectors for ground elements and feed elements.

The antenna units 8 and 9 are mounted to a non-radiating substrate 5, via, for example, an adhesive layer applied to the substrate 5. A protection layer (not shown) is also typically provided to cover the antenna units 8 and 9 and the exposed areas of the substrate 5 that are uncovered by the antenna units 8 and 9. In FIGS. 1-3, the front surfaces of the substrate 5 and the antenna units 8 and 9 are illustrated. The back surface 6 of the substrate 5 is shown in FIG. 7.

The antenna unit 8 includes a feed element 10, a ground element 20, and a planar radiating element 30.

The planar radiating element 30 is implemented from a metallic material, for example as a microstrip, and is a multi-band antenna element configured to operate at a plurality of frequency bands including at least one frequency band at which location signals are communicated and multiple frequency bands at which wireless broadband signals are communicated, thereby supporting, within a single radiating element that occupies a small footprint, communication of location signals and communication of wireless broadband signals.

In the illustrated embodiments, the wireless broadband standard which the planar radiating element 30 is configured to support is the LTE wireless broadband standard. Therefore, throughout the remaining portions of the present description, the terms "wireless broadband" and "LTE" will be used interchangeably. However, the term "LTE" as used in the present description should be interpreted to encompass all variations of "wireless broadband" as defined above, unless explicitly stated otherwise. In addition, when referring to a particular cellular/wireless broadband standard herein, the word "standard" will be used. Thus, for example, the term "LTE standard" refers to the telecommunications LTE standard as developed by the 3rd Generation Partnership Project. In addition, in the illustrated embodiments, the satellite-based location system which the planar radiating element 30 is configured to support is GPS. Therefore, throughout the remaining portions of the present description, the word "location", for example as used in the term "location signal", and "GPS" will be used interchangeably. However, the term "GPS" as used in the present description should be interpreted to encompass all variations of "satellite-based location systems" as defined above, unless explicitly stated otherwise.

Figure 4:
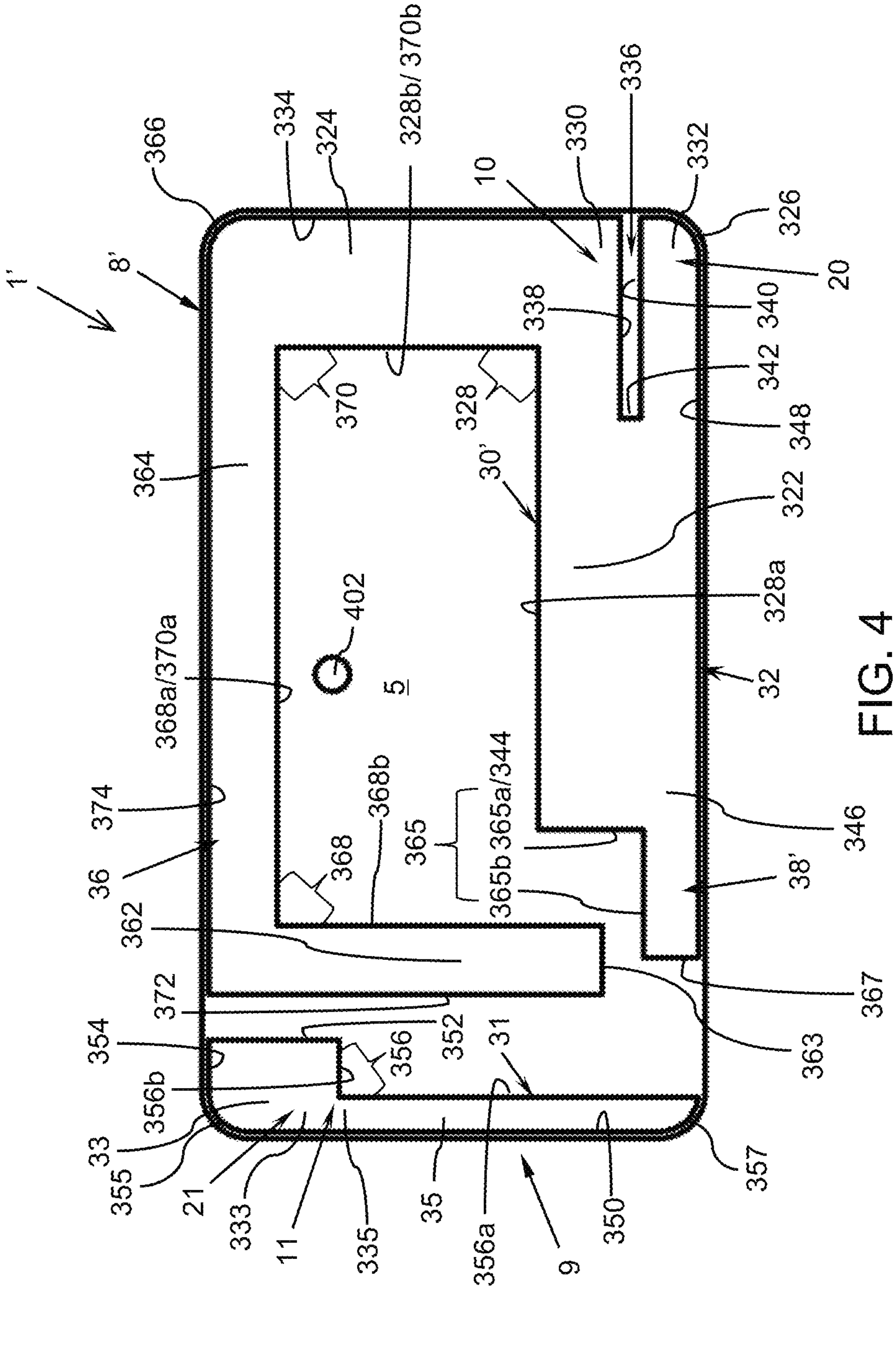
FIG. 4 is a top view of a planar inverted-F antenna according to another embodiment of the present invention.
Figure 5:
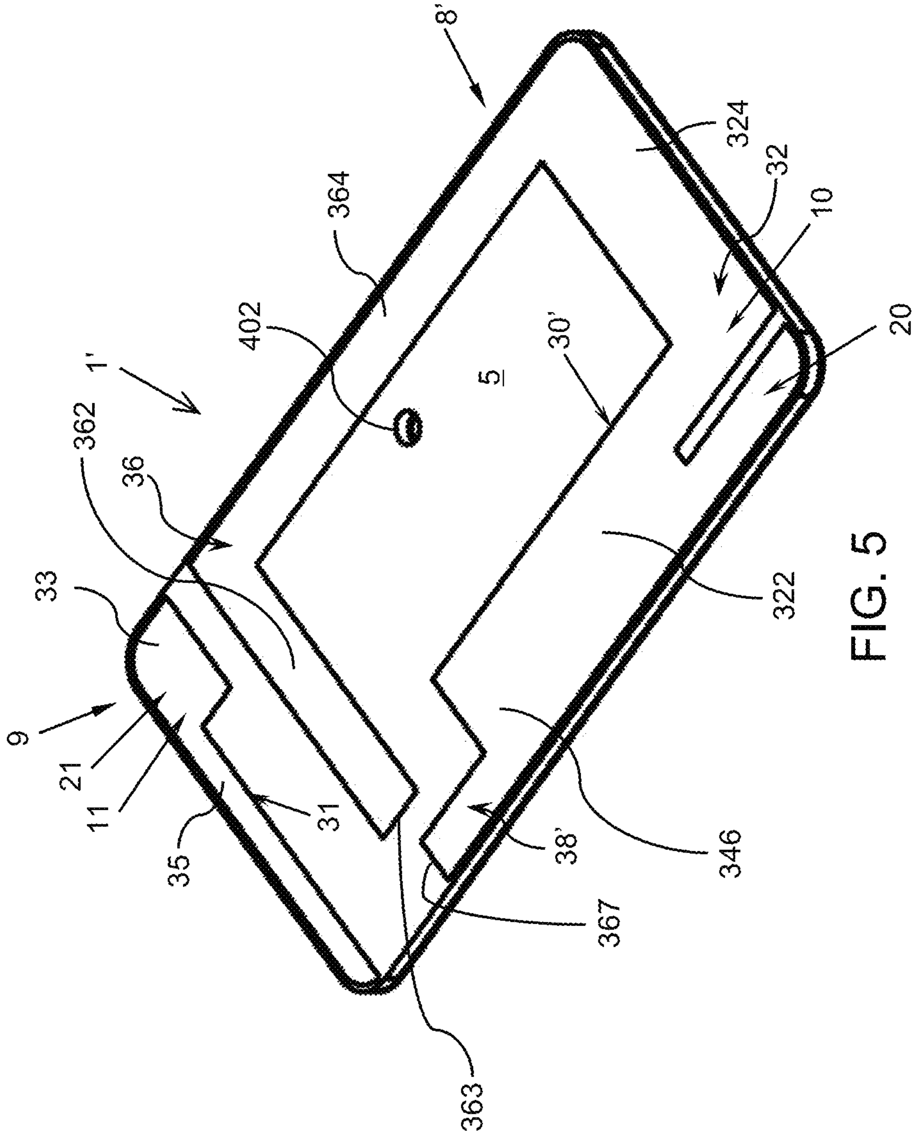
FIG. 5 is an isometric view of the planar inverted-F antenna of FIG. 4.
Figure 6:
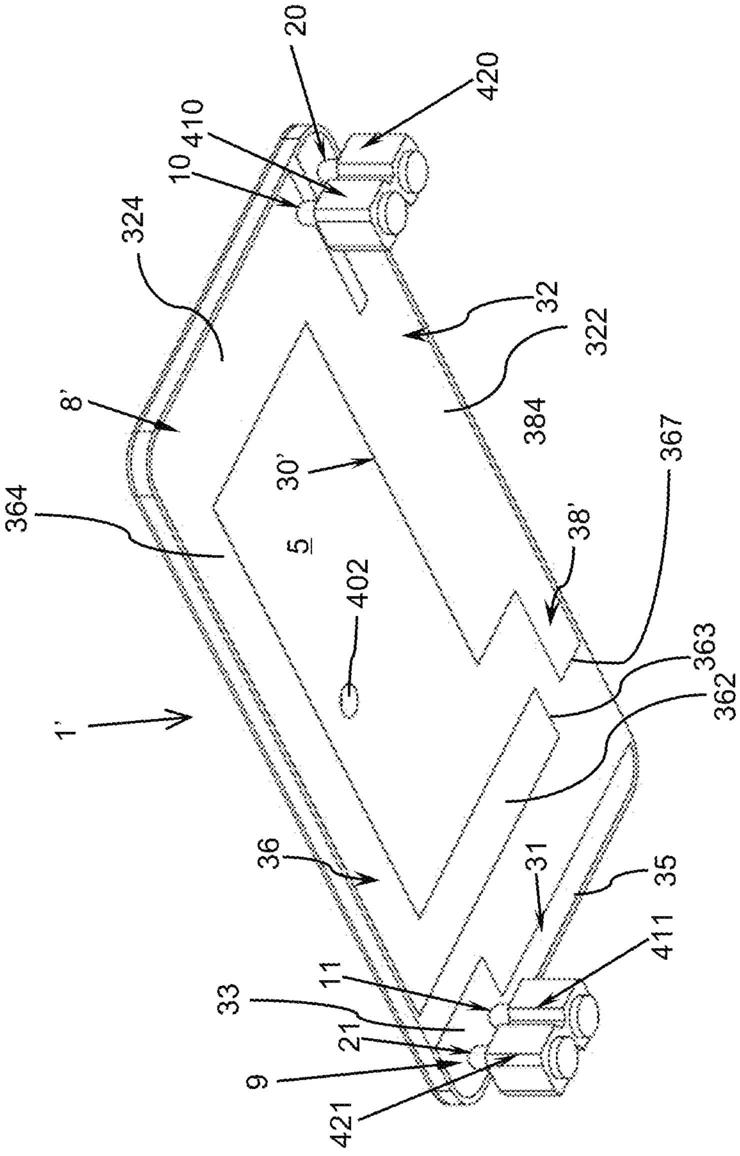
FIG. 6 is another isometric view of the planar inverted-F antenna of FIG. 4, showing electrical connectors for the ground elements and the feed elements of the planar inverted-F antenna.

Bearing the above in mind, support of communication of GPS and LTE signals, at particular operational frequencies, within a single element that occupies a small footprint, is enabled by the particular geometry of the planar radiating element 30. It is therefore noted that modifications to the geometry of the planar radiating element 30 may result in different operational frequency bands of wireless broadband signals and/or different operational frequency bands of GPS signals that are supported by the planar radiating element 30, as should be apparent to those of ordinary skill in the art. For example, adjusting one or more geometric parameters of the planar radiating element 30, such as, for example, the length, width, bend angles and the like, may result in changes in transmission and/or reception capability of signals in certain LTE and/or GPS operational frequency bands. Bearing this in mind, the geometry of the planar radiating element 30 in the embodiment illustrated in FIGS. 1-3 supports communication of wireless broadband signals at operational frequency bands that are compliant with LTE standards in North America, and therefore the embodiment illustrated in FIGS. 1-3 is particularly suitable for use with LTE standard compliant electronic devices in North America, in particular the United States. As mentioned, the geometry of planar radiating element 30 may be modified to support communication of wireless broadband signals at different frequency bands, for example frequency bands that are compliant with LTE standards in Europe. The embodiment illustrated in FIGS. 4-6 is an example of a PIFA design having a planar radiating element 30 with a geometry that is particularly suitable for use with LTE standard compliant electronic devices in Europe.

Referring again to FIGS. 1-3, the planar radiating element 30 includes two generally L-shaped regions (i.e., "quasi-L-shaped regions", "approximately L-shaped regions") 32, 36, and another region 38, which in the present embodiment is a generally (i.e., quasi, approximately) L-shaped region, that forms a continuation of the L-shaped region 36. The L-shaped regions 32, 36, 38 are each "inverted" L-shaped regions, meaning that each of the regions 32, 36, 38 resembles a conventional letter "L", as it would appear when looking at FIG. 1 from left-to-right in the proper orientation, after being reflected (i.e., reversed) about a horizontal axis, reflected about a vertical axis, reflected about both horizontal and vertical axes, rotated 90-degrees about an axis of rotation that is perpendicular to the plane of the paper, or some combination thereof. Thus, the orientation of the regions 32, 36, 38 can be made to be the same as the orientation of a conventional letter "L" by performing one or more of the aforementioned reflections and rotation.

The L-shaped regions 32, 36 are inverted one with respect to the other, and form continuations of each other, such that the planar surfaces of the two regions 32, 36, when taken together, preferably form a single continuous surface. The inversion of the two L-shaped regions 32, 36, one with respect to the other, is such that each L-shaped region 32, 36 is reflected (i.e., reversed) about a horizontal axis and a vertical axis one with respect to the other. In other words, the two L-shaped regions 32, 36 are upside-down and reversed, or equivalently, rotated 180-degrees about an axis that is perpendicular to the plane of the paper, one with respect to the other.

The L-shaped region 32 is defined by a plurality of lateral sides, including a lower lateral side 348, an inner lateral side 344, an outer lateral side 334 that is parallel to the inner lateral side 344, and an L-shaped inner lateral side 328. The L-shaped inner lateral side 328 is formed from two side segments 328*a*, 328*b* that are joined at a 90-degree angle, thereby defining the L-shape of the lateral side 328. It is noted that the L-shaped inner lateral side 328 is an "inverted" L-shape, where the inversion follows a similar meaning as defined with respect to the L-shaped regions 32, 36, 38 discussed above.

The segment 328*a* and the lower lateral side 348 are parallel to each other, and are perpendicular to the inner lateral side 344 which connects the segment 328*a* and the lower lateral side 348 at end portions thereof, preferably at 90-degree angles. The segment 328*a* and the lower lateral side 348 define in part a first leg portion 322 of the L-shaped region 30. The leg portion 322 is further defined by a lower segment of the outer lateral side 334. The segment 328*b* and an upper segment of the outer lateral side 334 define a second leg portion 324 of the L-shaped region 30.

A generally rectangular slot 336 is formed in the leg portion 322, and extends inward from the lower segment of the outer lateral side 334. The slot 336 is defined by a plurality of lateral sides, including an inner upper lateral side 338, an inner lower lateral side 340, and an inner lateral side 342, that together form a general U-shape. The lateral sides 338, 340 are parallel to each other, and also parallel to the lateral sides 348, 328*a*, and are perpendicular to the lateral side 342, which is parallel to the lateral sides 334, 344. A corner 326 connects between the lateral sides 340 inner lateral side 340 and 348. In the illustrated embodiment, the corner 326 is curved, but in other embodiments the corner may be 90-degree bend.

The leg portion 322 has an area (sub-portion, region) 330 located on one side of the slot 336 (above the lateral side 338), and another area (sub-portion, region) 332 located on the other side of the slot 336 opposite the side at which the area 330 is located (i.e., below the lateral side 340).

The ground element 20 is located in the area 332 so as to be electrically connected to the area 332, and can be electrically connected to a ground plane (represented as a printed circuit board (PCB) 400 in FIG. 7) of an electronic device (not shown) via a ground connector 420 (FIG. 3), which can include one or more wires and/or coaxial cable, and which can be soldered to the ground element 20 at the area 332.

The feed element 10 is located in the area 330 so as to be electrically connected to the area 330. The feed element 10 can be electrically connected to an electronic device (not shown) via a feed connector 410, which can include one or more wires and/or coaxial cable, and which can be soldered to the feed element 10 at the area 330. The feed element 10, via the feed connector 410, feeds signal into the antenna unit 8.

The L-shaped region 36 is defined by a plurality of lateral sides, including a lateral side 372, an upper lateral side 374, a lower lateral side 386 that is parallel to the upper lateral side 374 and is colinear with the lateral side 348, and an L-shaped inner lateral side 368. The L-shaped inner lateral side 368 is formed from two side segments 368*a*, 368*b* that are joined at a 90-degree angle, thereby defining the L-shape of the lateral side 368. It is noted that the L-shaped inner lateral side 368 is an "inverted" L-shape, where the inversion follows a similar meaning as defined with respect to the L-shaped regions 32, 36, 38 and the L-shaped lateral side 328 discussed above.

The lateral side 372 connects between the upper lateral side 374 and the lower lateral side 386 at end portions thereof, preferably at 90-degree angles.

The segment 368*b* and the lateral side 372 are parallel to each other, and are perpendicular to the lateral sides 386 and 374 (which are parallel to the lateral side 348), and define in part a first leg portion 362 of the L-shaped region 36. The leg portion 362 is further defined by a segment of the lower lateral side 386. The segment 368*a* and the upper lateral side 374 define a second leg portion 364 of the L-shaped region 36.

As mentioned above, the L-shaped regions 32, 36 form continuations of each other, meaning that the two L-shaped regions 32, 36, when taken together, form a single continuous surface area. In the illustrated embodiment, this continuation can be seen by the joining of the lateral sides 374 and 334 at the corner 366, resulting in a smooth transition between the leg portion 364 of the L-shaped region 36 and the leg portion 324 of L-shaped region 32. It is noted that in the illustrated embodiment, the corner 366 is curved, but in other embodiments the corner may be 90-degree bend.

The continuation can also be seen by the presence of the L-shaped inner lateral side 370. The L-shaped inner lateral side 370 is an "inverted" L-shape, where the inversion follows a similar meaning as defined with respect to the L-shaped regions and L-shaped lateral sides discussed above. The L-shaped inner lateral side 370 is formed from two side segments 370*a*, 370*b* that are joined at a 90-degree angle, thereby defining the L-shape of the lateral side 370. The side segments 370*a* and 370*b* are actually the same as (i.e., common with) the side segments 368*a* and 328*b*, respectively.

As mentioned above, the radiating element 30 also includes another region 38, which in the present embodiment is a generally L-shaped region, that forms a continuation of the L-shaped region 36. The region 38 forms the continuation of the L-shaped region 36 at or near a portion of the lateral side 368*b* that is located at a lower portion of the L-shaped region 36, which is located in a lower portion 376 of the leg portion 362.

The region 38 is defined by a plurality of lateral sides, including a proximal segment of the lower lateral side 386 that is proximate to the inner lateral side 344, an inner upper lateral side 389 that is parallel to the lower lateral side 386, an inner lateral side 388, an inner lateral side 390 that is the same as (i.e., common with) the side segment 368*b* and that is parallel to the lateral side 388, and an L-shaped inner lateral side 392. In the illustrated embodiment, the inner upper lateral side 389 extends beyond the side segment 328*a*, however the inner upper lateral side 389 may be shortened or lengthened according to design needs.

The L-shaped inner lateral side 392 is an "inverted" L-shape, where the inversion follows a similar meaning as defined with respect to the L-shaped regions and L-shaped lateral sides discussed above. The L-shaped inner lateral side 392 is formed from two side segments 392*a*, 392*b* that are joined at a 90-degree angle, thereby defining the L-shape of the lateral side 392. The side segment 392*a* is parallel to the lateral sides 388 and 390/368*b*. The side segment 392*b* is parallel to the lateral sides 386 and 389. The lateral side 388 connects between the inner upper lateral side 389 and the proximal segment of the lower lateral side 386 at end portions thereof, preferably at 90-degree angles.

It is noted that the inner lateral side 390 and the side segment 392*b* are also joined at a 90-degree angle so as to combine to form an L-shaped lateral side.

A first leg portion 382 of the region 38 is defined by the segment of the lower lateral side 386, a lower segment of the lateral side 388, and the side segment 392*b*. The leg portion 382 forms a continuation of the lower portion 376 of the leg portion 362. A second leg portion 384 of the region 38 is defined by the side segment 392*a*, the inner lateral side 388, and the inner upper lateral side 389. The second leg portion 384 is laterally spaced apart from the inner lateral side 344, leaving a space between the region 38 and the first leg portion 322 of the L-shaped region 30.

In the illustrated embodiment, the region 38 forms a continuation of the L-shaped region 36 such that the region 38 (in particular the lower portion 376) and the L-shaped region 36 (in particular the first leg portion 382 and the second leg portion 384) together form a tightly meandered region. This tightly meandered region is a generally U-shaped region.

In the illustrated embodiment, the geometry of the antenna unit 8, and in particular geometry of the radiating element 30, is such that the exposed areas of the substrate 5 include a large rectangular area (region) 34*a* and two smaller rectangular areas (regions) 34*b* and 34*c*. The large rectangular area 34*a* is primarily defined by the side segments 328*a*, 328*b*/370*b*, 368*a*/370*a* and the upper portion of the side segment 368*b*. One of the smaller rectangular areas 34*b* is primarily defined by the L-shaped inner lateral side 392 and the lower portion of the inner lateral side 390/368*b*. The other of the smaller rectangular areas 34*c* is primarily defined by the inner lateral sides 344 and 388. These exposed areas 34*a*, 34*b*, 34*c* together form an inverted general F-shape.

In the illustrated embodiment, a through hole (i.e., an aperture) 402 is provided in a portion of the large rectangular area 34*a*. The through hole 402 is dimensioned to accommodate a correspondingly dimensioned light pipe, light-guide, or any other light-conveying means, which can be fed through the through hole 402 so as to pass through the antenna unit 8 and the substrate 5 to the ground plane 400, and even through the ground plane 400 to another layer of electronic components, in order to carry illumination to or from an LED or other illumination component of the electronic device.

According to certain embodiments, such as the embodiment illustrated in FIGS. 1-3, the PIFA 1 further includes second antenna unit 9 that supports communication of Bluetooth standard compliant signals and preferably also supports communication of Wi-Fi standard compliant signals. The antenna unit 9 includes a feed element 11, a ground element 21, and a planar radiating element 31 implemented from a metallic material.

The planar radiating element 31 is a multi-band antenna element configured to operate at one or more frequency bands at which Bluetooth signals are communicated so as to support, within a single element, communication of Bluetooth signals. Preferably, the planar radiating element 31 is also configured to operate at one or more frequency bands at which Wi-Fi signals are communicated so as to support, within a single element, communication of Wi-Fi signals.

The planar radiating element 31 is formed as a generally L-shaped region having two leg portions 33 and 35. Geometrically speaking, this L-shaped region is an exaggerated or flattened L-shape in the sense that one of the legs 33 is significantly compressed in one dimension.

The L-shaped planar radiating element 31 is defined by a plurality of lateral sides, including an outer lateral side 350, an inner lateral side 352 that is parallel to the outer lateral side 350, an upper lateral side 354 that connects between the lateral sides 350 and 352 via a corner 355 (which can be curved but may be a 90-degree bend), and an L-shaped inner lateral side 356 that is formed from two side segments 356*a*, 356*b* that are joined at a 90-degree angle so as to define the L-shape of the lateral side 356. A corner 357 connects between the side segment 356*a* and the outer lateral side 350. The corner 357 can be curved, as in the illustrated embodiment, but may be a 90-degree bend.

The side segment 356*a* is parallel to the following lateral sides and side segments: 350, 352, 372, 390, 388, 344, 334, 368*b*, 328*b*. The side segment 356*b* is parallel to the following lateral sides and side segments: 354, 374, 368*a*, 389, 328*a*, 392*b*, 386, 348, 338, 340.

The leg portion 33 is generally defined by the side segment 356*b*, the lateral side 352, the upper later side 354, the corner 355, and an upper portion of the outer lateral side 350. The leg portion 35 is generally defined by the side segment 356*a*, the corner 357, and a lower portion of the outer lateral side 350.

One area (sub-portion, region) 333 of the radiating element 31 is located in an upper or middle region/portion of the leg portion 33. Another area (sub-portion, region) 335 of the radiating element 31 is located in an upper region/portion of the leg portion 35 or in a lower region/portion of the leg portion 33 so as to be located at or near the intersection of the two leg portions 33, 35.

The ground element 21 is located in the area 333 so as to be electrically connected to the area 333, and can be electrically connected to the ground plane 400 (FIG. 7) of an electronic device (not shown) via a ground connector 421, which can include one or more wires and/or coaxial cable, and which can be soldered to the ground element 21 at the area 333.

The feed element 11 is located in the area 335 so as to be electrically connected to the area 335. The feed element 11 can be electrically connected to an electronic device (not shown) via a feed connector 411, which can include one or more wires and/or coaxial cable, and which can be soldered to the feed element 11 at the area 335. The feed element 11, via the feed connector 411, feeds signal into the antenna unit 9.

The geometry of the radiating elements 30, 31 and the lateral spacing therebetween is such that the lateral side 372 is closer in proximity to the inner lateral side 352 than to the side segment 356*a*. In addition, the geometry of the radiating elements 30, 31 and the lateral spacing therebetween is such that the exposed areas of the substrate 5 includes a generally L-shaped area (region) 34*d* between the two antenna units 8 and 9.

With continued reference to FIGS. 1-6, attention is directed to FIG. 7, which shows the PIFA 1 (of FIGS. 1-3) or a PIFA 1' (of FIGS. 4-6, as will be discussed) according to embodiments of the present disclosure electrically connected to the ground plane PCB 400. Also shown in FIG. 7 are the feed connectors 410 and 411 and the ground connectors 420 and 421, as well as an electronics assembly 404 (having a PCB and other electronic components) of the electronic device with which the PIFA is to be used.

Figure 8:
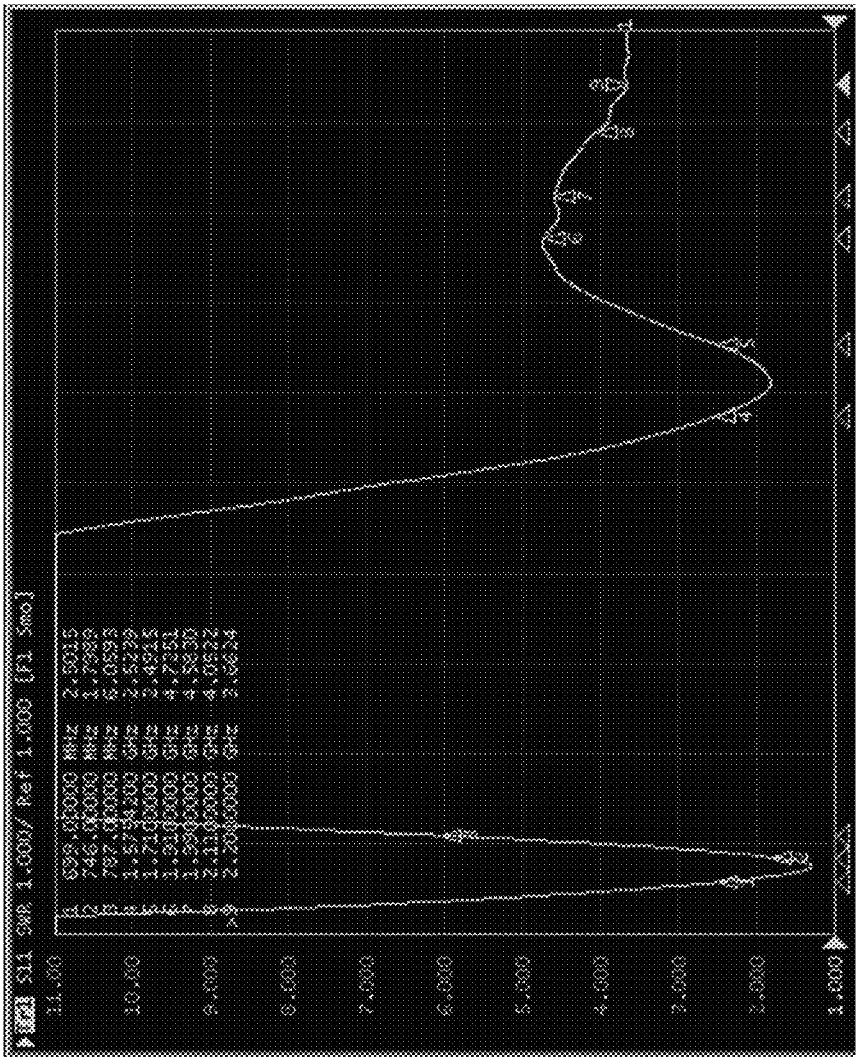
FIG. 8 shows the voltage standing wave ratio (VSWR) for the first antenna unit of the PIFA of FIGS. 1-3.

FIG. 8 shows the voltage standing wave ratio (VSWR) for the antenna unit 8 of the multi-band PIFA 1 according to the embodiment illustrated in FIGS. 1-3. The VSWR measurements for the antenna unit 8 are approximately 2.50, 1.80, 6.06, 2.52, 2.49, 4.72, 4.58, 4.05, and 3.66 for operational frequencies of 699 MHz, 746 MHz, 787 MHz, 1575.54 MHZ, 1710 MHz, 1910 MHz, 1990 MHz, 2100 MHZ, and 2200 MHz, respectively. In the list of operational frequencies, the operational frequency 1575.54 MHz is an operational frequency in a band utilized by GPS signals. The other operational frequencies in the list are operational frequencies that cover critical bands utilized by LTE networks in the United States, referred to as bands B1, B2, B3, B4, B12, B13, B25, and B39. As can be seen from this FIG. 8, all the VSWR measurements for the antenna unit 8 of the multi-band PIFA 1 of the present embodiment at frequencies of interest are below approximately 6.00. This proves the antenna unit 8 of the multi-band PIFA 1 of the present embodiment has excellent VSWR for multiple frequencies, including frequencies in bands of interest. It is noted that in certain cellular subscriber networks, such as those operated by AT&T Inc. of Dallas, USA and Verizon Communications Inc. of New York, USA, the most critical bands are bands B2, B4, B12, and B13, which together cover the operational frequencies of 1850 MHZ, 1880 MHz, 1910 MHz, 2100 MHZ, 2133 MHZ, 2155 MHZ, 699 MHz, 716 MHZ, 729 MHZ, 746 MHZ, 756 MHz, 756 MHz, 777 MHz, and 787 MHz.

Figure 9:
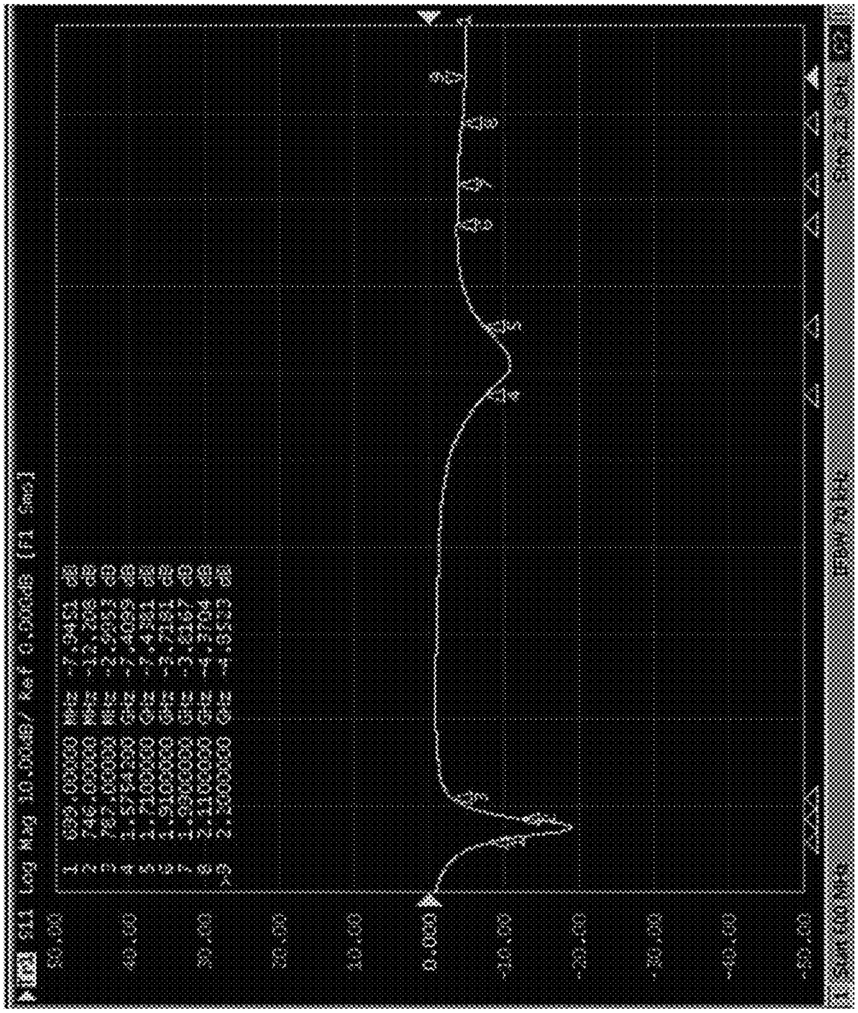
FIG. 9 shows the return loss measurement for the first antenna unit of the PIFA of FIGS. 1-3.

FIG. 9 shows the return loss measurements for the antenna unit 8 of the multi-band PIFA 1 according to the embodiment illustrated in FIGS. 1-3. The return loss measurements for operational frequencies of 699 MHz, 746 MHz, 787 MHz, 1575.54 MHz, 1710 MHz, 1910 MHZ, 1990 MHZ, 2100 MHZ, and 2200 MHz are approximately −7.94 dB, −12.21 dB, −2.99 dB, −7.41 dB, −7.44 dB, −3.72 dB, −3.82 dB, −4.37 dB, and −4.85 dB, respectively. As can be seen from FIG. 9, all the return loss all the VSWR measurements for the antenna unit 8 of the multi-band PIFA 1 of the present embodiment at frequencies of interest are below approximately −3.0 dB. This proves the antenna unit 8 of the multi-band PIFA of the present embodiment has excellent return loss for multiple frequencies, including frequencies in bands of interest.

Figure 10:
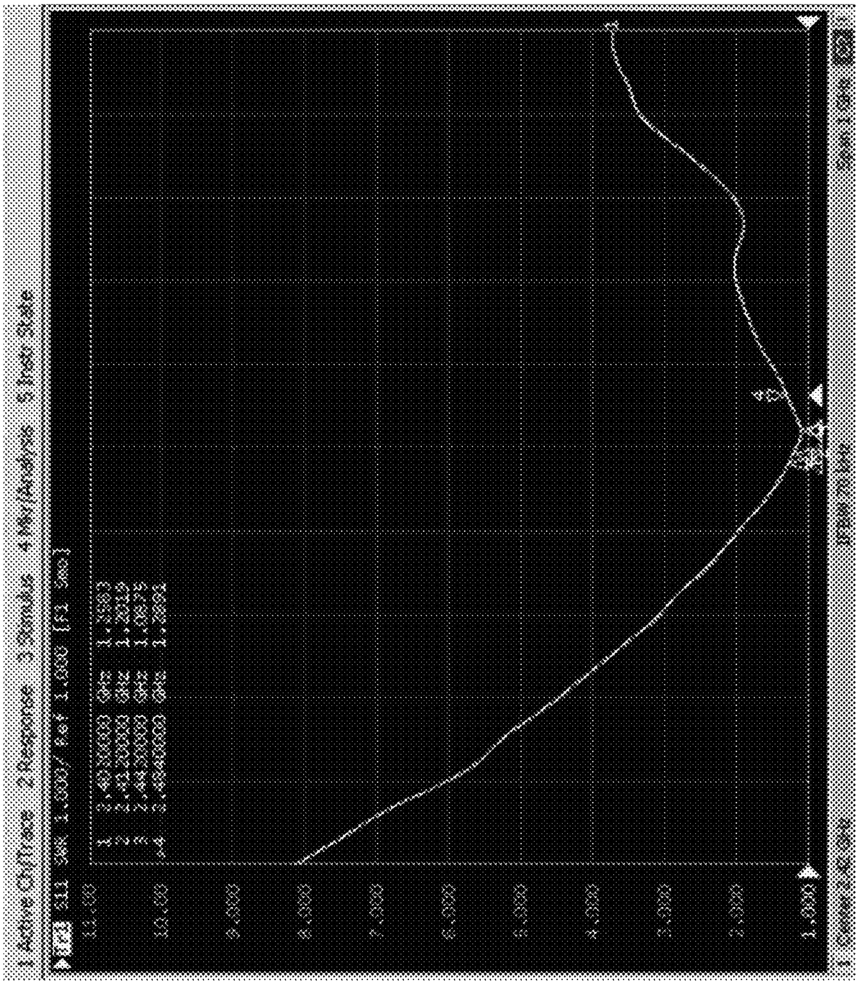
FIG. 10 shows the VSWR for the second antenna unit of the PIFA of FIGS. 1-3.

FIG. 10 shows the VSWR for the antenna unit 9 of the multi-band PIFA 1 according to the embodiment illustrated in FIGS. 1-3. The VSWR measurements for the antenna element 9 are approximately 1.26, 1.20, 1.09, and 1.29 for operational frequencies of 2.40 GHz, 2.41 GHZ, 2.44 GHZ, and 2.48 GHz, respectively. In the list of operational frequencies, the operational frequency 2.40 GHz is an operational frequency in a band utilized by Bluetooth (BT) signals. The other operational frequencies in the list are operational frequencies that cover bands utilized by both BT signals and WLAN signals.

As can be seen from this FIG. 10, all the VSWR measurements for the antenna unit 9 of the multi-band PIFA 1 of the present embodiment at frequencies of interest are below 1.5. This proves the antenna element 9 of the multi-band PIFA of the present embodiment has excellent VSWR for multiple frequencies.

Figure 11:
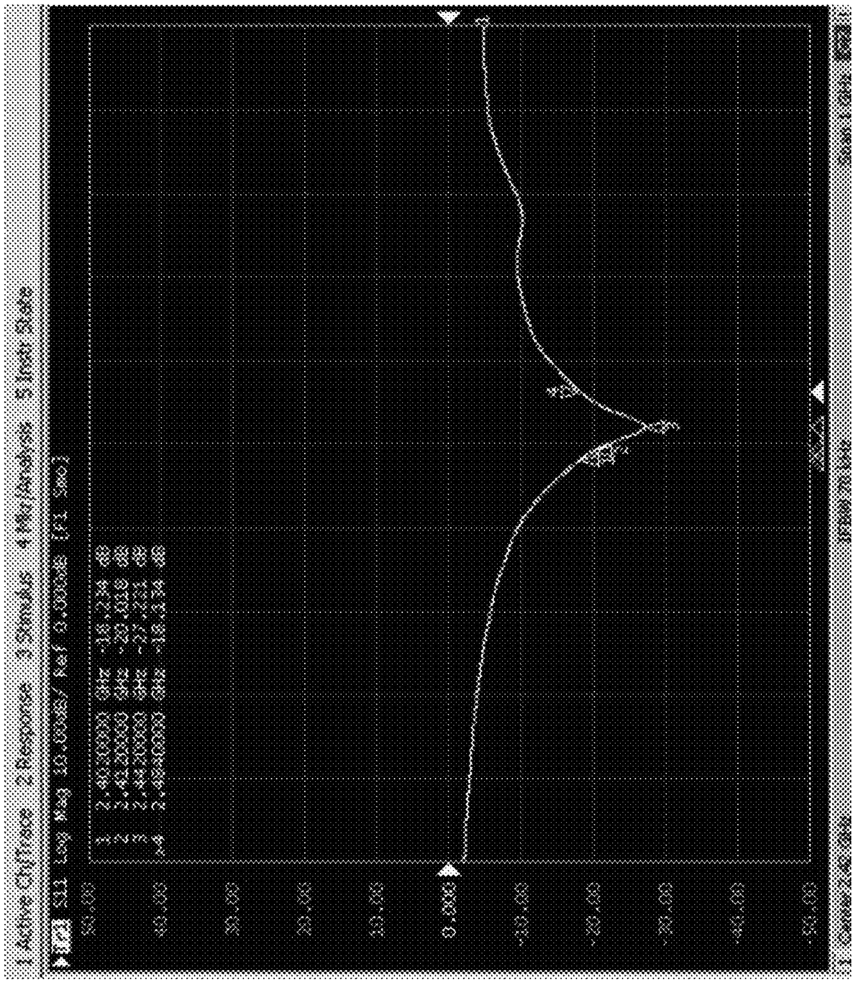
FIG. 11 shows the return loss measurement for the second antenna unit of the PIFA of FIGS. 1-3.

FIG. 11 shows the return loss measurement for the antenna unit 9 of the multi-band PIFA 1 according to the embodiment illustrated in FIGS. 1-3. The return loss measurements for operational frequencies of 2.40 GHz, 2.41 GHz, 2.44 GHZ, and 2.48 GHz are approximately −18.23 dB, −20.01 dB, −27.22 dB, and −18.13 dB, respectively. As can be seen from FIG. 10, all the return loss all the VSWR measurements for the antenna unit 9 of the multi-band PIFA 1 of the present embodiment at frequencies of interest are below −18.0 dB. This proves the antenna unit 9 of the multi-band PIFA of the present embodiment has excellent return loss for multiple frequencies.

As discussed above, the support of communication of GPS and LTE signals, at particular frequencies, within a single radiating element, is enabled by the geometry of the planar radiating element 30. Minor variations to the dimensions of regions of the planar radiating element 30 can result in support of operational frequencies that are different from those operational frequencies supported by the antenna unit 8. Bearing the above in mind, attention is now directed to FIGS. 4-6, which illustrate a PIFA 1' according to another non-limiting embodiment of the present invention having an antenna unit 8' that supports European wireless broadband operational frequencies and frequency bands. The PIFA 1' is generally similar to the PIFA 1, with the exception that the geometry of the planar radiating element 30' of the antenna unit 8' is different from the geometry of the planar radiating element 30 of the antenna unit 8. This geometric difference allows the antenna unit 8' to support European wireless broadband operational frequencies and frequency bands, in particular for European LTE networks, as opposed to those operational frequencies and frequency bands that are compliant with American wireless broadband, e.g., LTE, networks. In all other aspects, the PIFAs 1 and 1' are practically identical.

One key difference between the geometries of the two embodiments is that the planar radiating element 30' of the antenna unit 8' does not have a tightly meandered U-shaped region as in the antenna unit 8. This is primarily due to the fact that in the antenna unit 8', the additional region 38' of the planar radiating element 30' is not a generally L-shaped region as in the planar radiating element 30, but is instead a generally rectangular shaped region that forms a continuation of the L-shaped region 32 at or near a portion of the inner lateral side 344 that is located at or near a lower area/portion 346 of the leg portion 322. As a result, the leg portion 362 has a lower lateral side 363 that is parallel to the lower lateral side 348 but is not colinear with lower the lateral side 348 as in the PIFA 1. In addition, the lower lateral side 348 extends along the bottom portion of the region 38' so as to partially define the region 38'. The region 38' is further defined by a lateral side 367 and an (inverted) L-shaped lateral side 365 that is formed from two side segments 365*a*, 365*b* that are joined at a 90-degree angle so as to define the inverted L-shape of the lateral side 365. The side segment 365*a* is actually the same as (i.e., common with) the inner lateral side 344.

The region 38' extends outward from the lower area/portion 346 of the leg portion 322 toward the leg portion 362 and intersects with an extension of a lower portion of the leg portion 362. In other words, the lateral side 367, if extended upward toward the leg portion 362, would intersect with the lower lateral side 363. In certain embodiments, this intersection may be a bisection.

Another difference between the geometries of the two embodiments is that the leg portion 324 of the planar radiating element 30' of the antenna unit 8' is generally thicker than the leg portion 324 of the planar radiating element 30 of the antenna unit 8, which makes the leg portion 364 of the planar radiating element 30' shorter than the leg portion 364 of the planar radiating element 30, and also allows a larger flow of current therethrough. Another difference between the two embodiments is that the slot 336 of the planar radiating element 30' of the antenna unit 8' extends further into the leg portion 322 as compared to the slot of the planar radiating element 30 of the antenna unit 8. Another difference between the two embodiments is that the leg portion 322 of the planar radiating element 30' of the antenna unit 8' is generally thinner than the leg portion 322 of the planar radiating element 30 of the antenna unit 8, which allows a lower flow of current therethrough.

As discussed above, the planar radiating element 30/30' supports, within a single radiating element, the communication of LTE signals and GPS signals. In certain terms, the L-shaped region 32 of the planar radiating element 30/30', and in certain cases more specifically the leg portion 322, is the portion of the planar radiating element 30/30' that supports frequencies in bands associated with GPS signals. Similarly, the L-shaped regions 36 and 38/38' of the planar radiating element 30/30', and in certain cases more specifically the leg portion 362 and the L-shaped region 38 or rectangular region 38', are the portions of the planar radiating element 30/30' that support frequencies in bands associated with LTE signals.

The antenna unit 8' of the multi-band PIFA 1' has both excellent VSWR and return loss for multiple frequencies, including frequencies in European wireless broadband frequency bands of interest.

Figure 12:
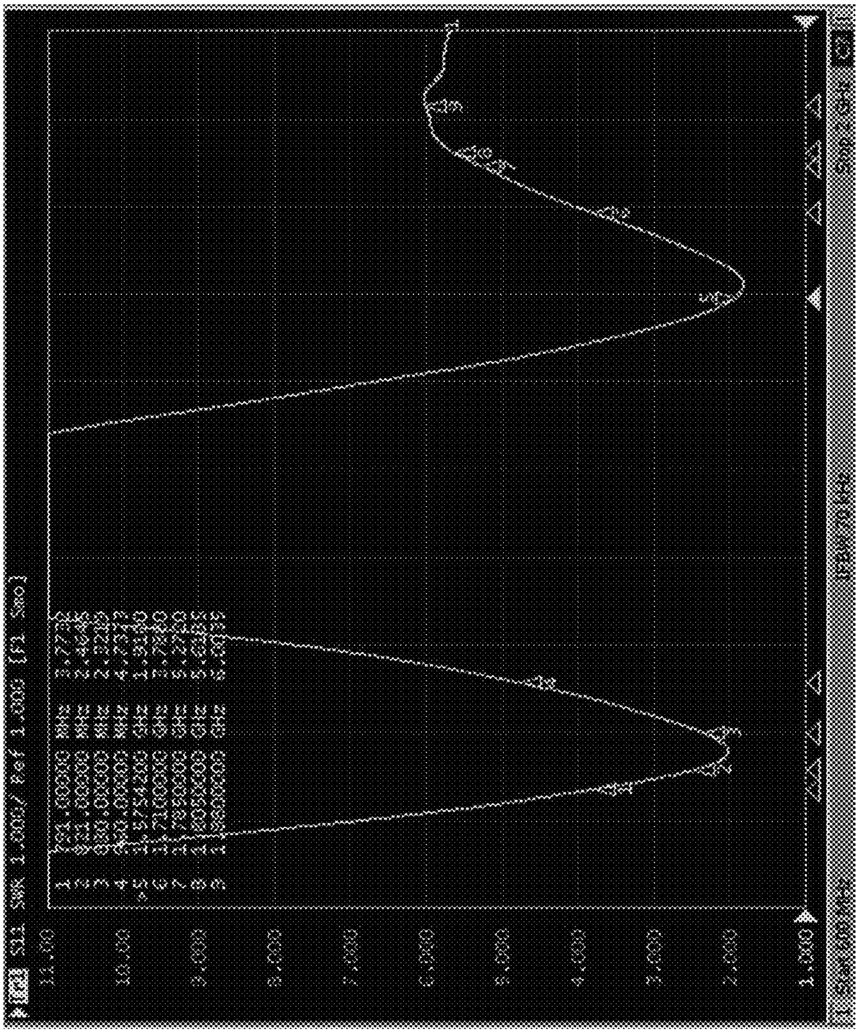
FIG. 12 shows the VSWR for the first antenna unit of the PIFA of FIGS. 4-6.

FIG. 12 shows the VSWR for the antenna unit 8' of the multi-band PIFA 1' according to the embodiment illustrated in FIGS. 4-6. The VSWR measurements for the antenna unit 8' are approximately 3.77, 2.46, 2.32, 4.73, 1.91, 3.78, 5.27, 5.61, and 6.00 for operational frequencies of 791 MHz, 821 MHz, 880 MHz, 960 MHz, 1575.42 MHz, 1710 MHz, 1785 MHz, 1805 MHZ, and 1880 MHz, respectively. In the list of operational frequencies, the operational frequency 1575.42 MHz is an operational frequency in a band utilized by GPS-type signals. The other operational frequencies in the list are operational frequencies that cover critical bands utilized by LTE networks in Europe. As can be seen from this FIG. 8, all the VSWR measurements for the antenna unit 8' of the multi-band PIFA 1' of the present embodiment at frequencies of interest are below approximately 6.00. This proves the antenna unit 8' of the multi-band PIFA 1' of the present embodiment has excellent VSWR for multiple frequencies, including frequencies in bands of interest.

Figure 13:
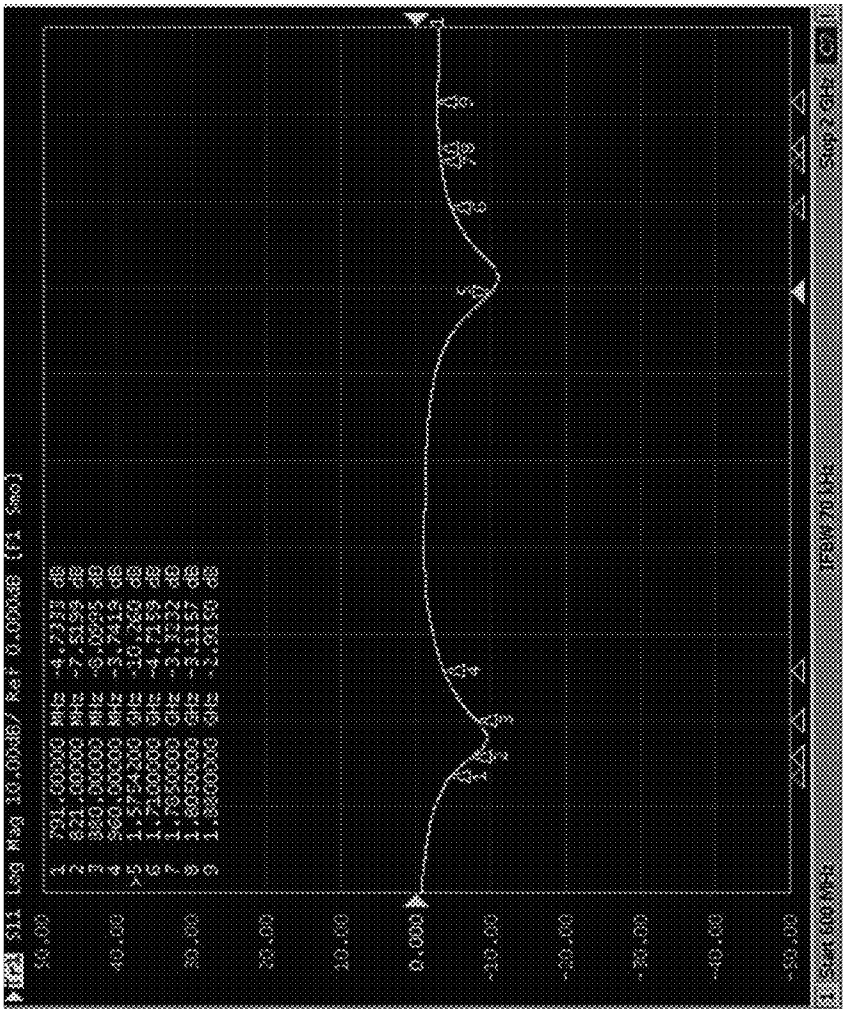
FIG. 13 shows the return loss measurement for the first antenna unit of the PIFA of FIGS. 4-6.

FIG. 13 shows the return loss measurements for the antenna unit 8' of the multi-band PIFA 1' according to the embodiment illustrated in FIGS. 4-6. The return loss measurements for operational frequencies of 791 MHz, 821 MHz, 880 MHz, 960 MHZ, 1575.42 MHz, 1710 MHz, 1785 MHz, 1805 MHZ, and 1880 MHz are approximately-4.73 dB, −7.52 dB, −8.10 dB, −3.74 dB, −10.26 dB, −4.72 dB, −3.32 dB, −3.12 dB, and −2.92 dB, respectively. As can be seen from FIG. 9, all the return loss all the VSWR measurements for the antenna unit 8' of the multi-band PIFA 1' of the present embodiment at frequencies of interest are below approximately −2.9 dB. This proves the antenna unit 8' of the multi-band PIFA 1' of the present embodiment has excellent return loss for multiple frequencies, including frequencies in bands of interest.

It is noted that the planar radiating elements 30', 30', 31 have been described herein as certain various lateral sides and/or side segments that are joined at 90-degree angles. It should be appreciated that these lateral sides and side segments can instead be joined by curved/rounded corners or joined at bend angles different from 90-degrees. In addition, the planar radiating elements 30', 30', 31 have been described herein as having certain lateral sides and/or side segments that are joined by curved/rounded corners. It should be appreciated that these lateral sides and side segments can instead be joined at 90-degree angles or at bend angles different from 90-degrees. As should be apparent to those skilled in the art, any modifications of the joining between lateral sides and/or side segments may influence or change the operational frequencies at which the antenna operates.

As alluded to above, the PIFA according to the embodiments of the present invention occupies a small footprint, making it particularly suitable for use with compact electronic devices that require both wireless broadband connectivity and location services provided by the reception of location signals as well as wireless broadband signals. In certain non-limiting implementations, the footprint of the PIFA according to certain embodiments of the present invention has a measurement along a first dimension in a range of 40 to 42 millimeters and more preferably no more than 41 millimeters, and a measurement along a second dimension in a range of 21 to 24 millimeters and more preferably no more than 23 millimeters, resulting in a significantly smaller footprint than conventional PIFA antennas. In addition, as discussed above with reference to FIGS. 8-11, the PIFA according to certain embodiments of the present invention is able to provide a reduced footprint without sacrificing in performance of the communication of wireless broadband signals, location signals, and Bluetooth (BT) and WLAN signals. In certain non-limiting embodiments, the planar radiating element 30/30' has a measurement along a first dimension in a range of 33 to 36 millimeters and preferably no more than 35 millimeters, and a measurement along a second dimension in a range of 21 to 24 millimeters and preferably no more than 23 millimeters. In certain non-limiting embodiments, the planar radiating element 31 has a measurement along the first dimension in a range of 3 to 5 millimeters and preferably no more than 5 millimeters, and a measurement along the second dimension in a range of 21 to 24 millimeters and preferably no more than 23 millimeters. In certain non-limiting embodiments, the spacing between the two planar radiating elements 30/30' and 31 is in the range of 1.5 to 3.5 millimeters and preferably no more than 3 millimeters.

In addition, the PIFA according to certain embodiments of the present invention is preferably spaced apart from the ground plane at a distance in a range of 4.5 to 6.5 millimeters and more preferably no more than 6 millimeters (measured along a third dimension (i.e., "height") that is perpendicular to the first and second dimensions). This relatively small "height" between the PIFA and the ground plane further contributes to the small form factor of the overall antenna design of the present invention.

The following paragraphs provide approximate distances between sides and side segments of the PIFA 1, so as to provide measurements and dimensions, for one non-limiting exemplary construction of the PIFA 1 according to certain embodiments of the present invention.

In the non-limiting construction of the PIFA 1 according to certain embodiments of the present invention, the distance between the side segment 328*a* and the lower lateral side 348 is approximately 10 millimeters.

In the non-limiting construction of the PIFA 1 according to certain embodiments of the present invention, the distance between the side segment 368*a* and the upper lateral side 374 is approximately 3 millimeters.

In the non-limiting construction of the PIFA 1 according to certain embodiments of the present invention, the distance between the side segment 368*a* and the side segment 328*a* is approximately 8.4 millimeters.

In the non-limiting construction of the PIFA 1 according to certain embodiments of the present invention, the distance between the upper lateral side 374 and the lower lateral side 348 is approximately 21.4 millimeters.

In the non-limiting construction of the PIFA 1 according to certain embodiments of the present invention, the distance between the inner upper lateral side 389 and the side segment 328*a* is approximately 1.5 millimeters.

In the non-limiting construction of the PIFA 1 according to certain embodiments of the present invention, the distance between the lateral side 372 and the side segment 368*b* is approximately 3 millimeters.

In the non-limiting construction of the PIFA 1 according to certain embodiments of the present invention, the distance between the inner lateral side 390 and the side segment 392*b* is approximately 1 millimeter.

In the non-limiting construction of the PIFA 1 according to certain embodiments of the present invention, the distance between the side segment 392*b* and the inner lateral side 388 is approximately 1.5 millimeters.

In the non-limiting construction of the PIFA 1 according to certain embodiments of the present invention, the distance between the inner lateral side 388 and the inner lateral side 344 is approximately 1.7 millimeters.

In the non-limiting construction of the PIFA 1 according to certain embodiments of the present invention, the distance between the inner lateral side 344 and the outer lateral side 334 is approximately 26.8 millimeters.

In the non-limiting construction of the PIFA 1 according to certain embodiments of the present invention, the distance between the side segment 328*b* and the outer lateral side 334 is approximately 3 millimeters.

In the non-limiting construction of the PIFA 1 according to certain embodiments of the present invention, the rectangular slot 336 extends inward from the outer lateral side 334 by approximately 8.5 millimeters, i.e., the distance between the inner lateral side 342 and the outer lateral side 334 is approximately 8.5 millimeters.

In the non-limiting construction of the PIFA 1 according to certain embodiments of the present invention, the distance between the inner lower lateral side 340 and the lower lateral side 348 is approximately 2.52 millimeters.

In the non-limiting construction of the PIFA 1 according to certain embodiments of the present invention, the distance between the inner lower lateral side 340 and the inner upper lateral side 338 is approximately 0.9 millimeters.

In the non-limiting construction of the PIFA 1 according to certain embodiments of the present invention, the distance between the inner upper lateral side 338 and the side segment 328*a* is approximately 6.58 millimeters.

In the non-limiting construction of the PIFA 1 according to certain embodiments of the present invention, the distance between the inner lateral side 352 and the inner lateral side 390 is approximately 2 millimeters.

In the non-limiting construction of the PIFA 1 according to certain embodiments of the present invention, the distance between the inner lateral side 352 and the side segment 356*a* is approximately 2.5 millimeters.

In the non-limiting construction of the PIFA 1 according to certain embodiments of the present invention, the distance between the inner lateral side 352 and the outer lateral side 350 is approximately 1.5 millimeters.

In the non-limiting construction of the PIFA 1 according to certain embodiments of the present invention, the distance between the upper lateral side 354 and the side segment 356*b* is approximately 5.7 millimeters.

It is noted that during the development of the PIFA according to the embodiments of the present invention, the inventors iterated on potential solutions for a reduced sized PIFA that supports communication of wireless broadband signals (e.g., LTE), location signals (e.g., GPS), and Bluetooth (BT) and WLAN signals. In one iteration, the inventors attempted to simply reduce the size (footprint) of the radiating elements of a conventional PIFA that has three separate radiating elements that respectively support communication of wireless broadband signals (e.g., LTE), location signals (e.g., GPS), and Bluetooth (BT) and WLAN signals. However, the inventors found that preferred size reduction could not be achieved with three radiating elements because the three radiating elements necessarily require a minimum distance from each other in order to meet performance requirements. In addition, when trying to improve the efficiency of the wireless broadband radiating element, the efficiency of the GPS radiating element was negatively affected. The PIFA according to certain embodiments of the present invention is a result of a realization by the inventors to merge together the LTE/GPS radiating elements into a single radiating element (nesting the GPS element as part of the LTE element) that still occupies a small footprint, thereby freeing even more space to add additional wireless broadband operational frequency bands, such as operational frequencies in band B13.

As discussed above, adjusting one or more geometric parameters of the planar radiating element 30/30', such as, for example, length, width, bend angles, etc., may influence the or change the operational frequencies at which the antenna operates. In addition, it is noted that although the regions 32, 36, 38 have been described herein as being “generally L-shaped”, “quasi-L-shaped”, or “approximately L-shaped” regions, this description does not preclude the aforementioned regions from having additional areas or regions extending therefrom or having variations, such as slots (of any suitable shape), inlets, and the like, therein. Thus, for example, any embodiment in which one or more additional areas or regions of a particular shape (e.g., rectangular, arcuate, etc.) extends from one or more of the lateral sides of the one or more of the regions 32, 36, 38, 38', still falls within the definition of L-shaped as used within the context of the present description and the appended claims. As should be appreciated by those of ordinary skill in the art, such variations can be used to modify the operational frequencies and/or bandwidths, or other operational characteristics, associated with the antenna, according to the specific application of the antenna. Furthermore, although the planar radiating elements 30', 30', 31 have been described herein as having various lateral sides and/or side segments that are joined at 90-degree angles, it should be appreciated that these lateral sides and side segments can instead be joined by curved/rounded corners or joined at bend angles different from 90-degrees. In addition, although the planar radiating elements 30', 30', 31 have been described herein as having various lateral sides and/or side segments that are joined by curved/rounded corners, it should be appreciated that these lateral sides and side segments can instead be joined at 90-degree angles or at bend angles different from 90-degrees. As should be apparent to those skilled in the art, any modifications of the joining between lateral sides and/or side segments may influence or change the operational frequencies at which the antenna operates.

Figure 14:
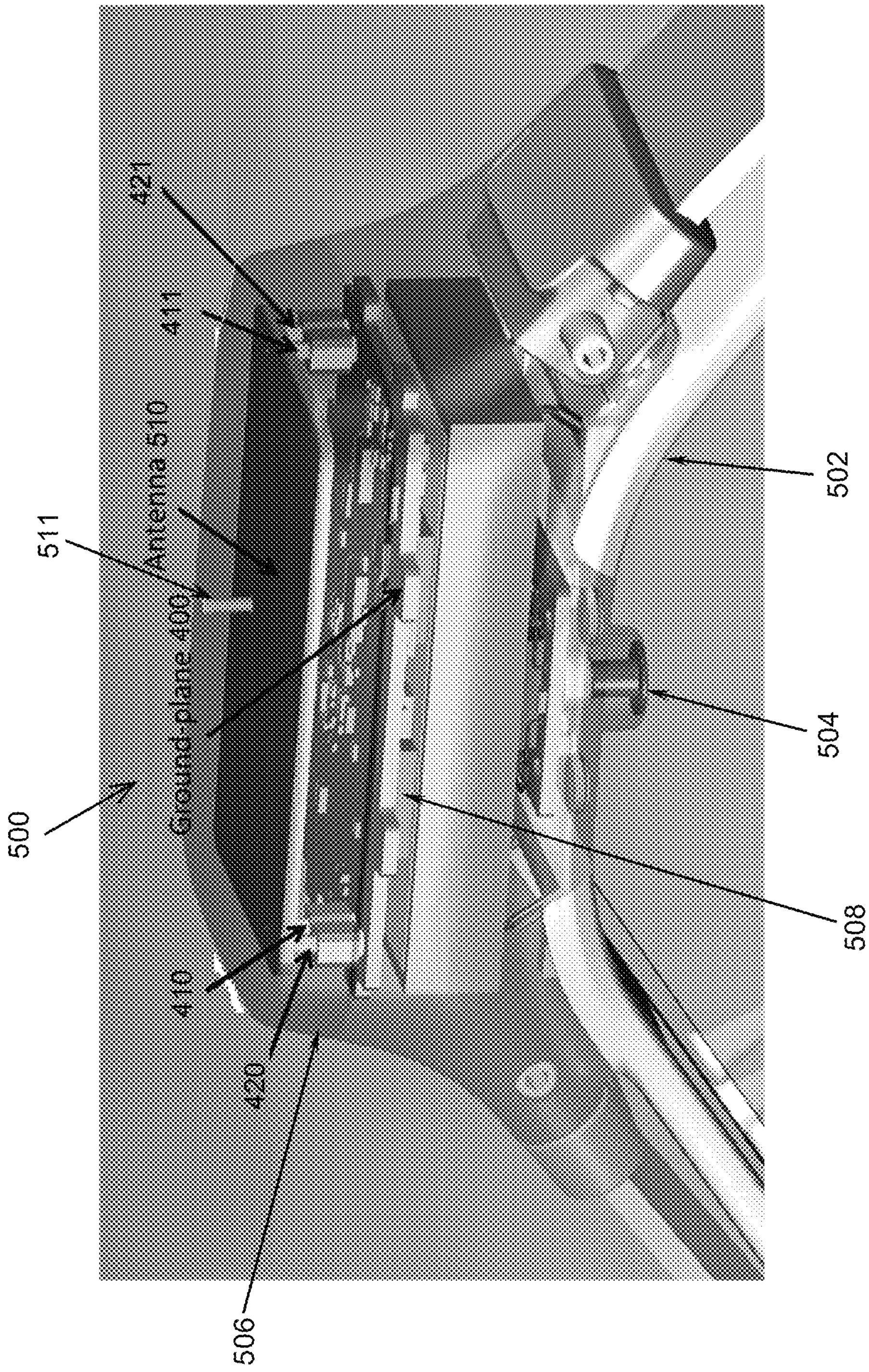
FIG. 14 is a schematic representation of an animal collar device with which the PIFA according to embodiments of the present invention can be used.

As mentioned above, the PIFA according to the present invention can be advantageously deployed as part of a wearable animal collar device that collects and monitors bioparameters (indicative of vital signs and other physiological and behavioral metrics) of an animal wearing the collar device. For example, the PIFA according to the embodiments of the present invention can be used to advantage as part of the animal collar device described in co-pending and co-owned U.S. patent application Ser. No. 17/873,206, entitled "Collar Devices, Systems, and Methods for Animal Monitoring", whose disclosure is incorporated by reference in its entirety herein. With continued reference to FIGS. 1-7, attention is now directed to FIG. 14, which shows a schematic representation of an animal collar device 500 with which the PIFA according to embodiments of the present invention can be used. The animal collar device 500 has a band 502 configured to an engage with a part of an animal, for example by wrapping around the neck of the animal, a sensor arrangement 504 that includes one or more sensors attached to the band 502 for measuring one or more bioparameters (e.g., pulse, breathing rate, heart rate, etc.) indicative of vital signs and other physiological and behavioral metrics, an electronics housing 506 attached to the band 502, and an electronics assembly 508 provided within the housing 506. The electronics assembly 508 includes one or more computerized processors (not shown) configured to receive data from the sensor arrangement 504 and process the data to extract vital sign and other physiological and behavioral information. The electronics assembly 508 also includes a PIFA 510, which is implemented as a PIFA according to embodiments of the present invention, such as, for example, the PIFA 1 or the PIFA 1'. FIG. 14 also shows a light pipe 511 that passes through the through hole 402 (FIGS. 1-7) in order to illuminate an LED or other illumination device that is part of, or is otherwise associated with, the electronics assembly 508. Although not shown in FIG. 14, the electronics assembly 508 also includes one or more transceivers, including a BT transceiver, a Wi-Fi transceiver, a cellular radio transceiver, and a GPS transceiver, that are all in signal communication with the PIFA 510. The BT transceiver is used to transmit and receive BT standard compliant signals, via the antenna unit 9, so as to provide a Bluetooth connection between the animal collar device 500 and another electronic device (such as a smartphone configured as a master device). The Wi-Fi transceiver is used to transmit and receive WLAN standard compliant signals, via the antenna unit 9, so as to provide a WLAN connection between the animal collar device 500 and a wireless local area network access point. The cellular transceiver is used to transmit and receive, via the antenna unit 8, cellular network standard compliant signals (e.g., LTE standard compliant signals) over a cellular communication network, such as an LTE network, so as to support the exchange of data and information, including extracted vital sign and other physiological and behavioral information, with other electronic devices, servers, and the like, connected to the cellular communication network. The data and information, supported by the transmission and reception of the cellular network standard compliant signals, may also include location data associated with the cellular transceiver and/or location data derived from other data associated with the cellular transceiver. The GPS transceiver is used to receive, via the antenna unit 8, location signals from one or more satellites of a GPS satellite constellation, so as to enable the derivation of location of the animal collar device 500 based on the received location signals, for example by one or more of the computerized processors of the electronics assembly 508.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

What is claimed is:

1. A planar inverted-F antenna, comprising:

a first planar radiating element including:

a first region, that is a substantially L-shaped region, a second region, that is a substantially L-shaped region inverted with respect to, and forming a continuation of, the first region, and a third region, that is a substantially L-shaped region that forms a continuation of the second region at a side of a lower portion of the second region such that the third region and a portion of the second region together form a tightly meandered region, the first planar radiating element being a multi-band radiating element configured to operate at a plurality of frequency bands including at least one frequency band at which location signals are communicated and multiple frequency bands at which wireless broadband signals are communicated so as to support, within a single radiating element, communication of location signals and communication of wireless broadband signals;

a first feed element electrically connected to a first area of the first planar radiating element; and a first ground element electrically connected to a second area of the first planar radiating element, wherein the first area to which the first feed element is electrically connected is located in a first area of the first region, and wherein the second area to which the first ground element is electrically connected is located in a second area of the first region.

2. The planar inverted-F antenna of claim 1, wherein the third region and a portion of the second region together form a substantially U-shaped region.

3. The planar inverted-F antenna of claim 1, wherein the first region includes a slot extending inward from a side of the first region, and wherein the first area of the first region and the second area of the first region are on opposite sides of the slot.

4. The planar inverted-F antenna of claim 1, wherein the location signals are communicated by a global positioning satellite system.

5. The planar inverted-F antenna of claim 1, wherein the wireless broadband signals are Long-Term Evolution (LTE) standard compliant signals.

6. The planar inverted-F antenna of claim 1, wherein the first planar radiating element has a measurement along a first dimension of no more than 35 millimeters and a measurement along a second dimension of no more than 23 millimeters.

7. The planar inverted-F antenna of claim 1, further comprising:

a second planar radiating element electrically connected to the first planar radiating element, the second planar radiating element formed as an L-shaped region and laterally spaced apart from the second region of the first planar radiating element, the second planar radiating element configured to operate at one or more frequency bands at which short-range wireless signals are communicated so as to support, within a second single element, communication of short-range wireless signals;

a second ground element electrically connected to a first area of the second planar radiating element; and a second feed element electrically connected to a second area of the second planar radiating element.

8. The planar inverted-F antenna of claim 7, wherein the second planar radiating element is further configured to operate at one or more frequency bands at which wireless local area network signals are communicated so as to support, within the second single element, communication of wireless local area network signals.

9. A planar inverted-F antenna, comprising:

a first planar radiating element including:

a first region, that is a substantially L-shaped region, a second region, that is a substantially L-shaped region inverted with respect to, and forming a continuation of, the first region, and a third region, that is a substantially L-shaped region that forms a continuation of the second region at a side of a lower portion of the second region such that the third region and a portion of the second region together form a substantially U-shaped region, the first planar radiating element being a multi-band radiating element configured to operate at a plurality of frequency bands including at least one frequency band at which location signals are communicated and multiple frequency bands at which wireless broadband signals are communicated so as to support, within a single radiating element, communication of location signals and communication of wireless broadband signals;

a first feed element electrically connected to a first area of the first planar radiating element; and a first ground element electrically connected to a second area of the first planar radiating element, wherein the first area to which the first feed element is electrically connected is located in a first area of the first region, and wherein the second area to which the first ground element is electrically connected is located in a second area of the first region.

10. The planar inverted-F antenna of claim 9, wherein third region and a portion of the second region together form a tightly meandered region.

11. The planar inverted-F antenna of claim 9, wherein the location signals are communicated by a global positioning satellite system.

12. The planar inverted-F antenna of claim 9, wherein the wireless broadband signals are Long-Term Evolution (LTE) standard compliant signals.

13. The planar inverted-F antenna of claim 9, further comprising:

a second planar radiating element electrically connected to the first planar radiating element, the second planar radiating element formed as an L-shaped region and laterally spaced apart from the second region of the first planar radiating element, the second planar radiating element configured to operate at one or more frequency bands at which short-range wireless signals are communicated so as to support, within a second single element, communication of short-range wireless signals;

a second ground element electrically connected to a first area of the second planar radiating element; and a second feed element electrically connected to a second area of the second planar radiating element.

14. The planar inverted-F antenna of claim 13, wherein the second planar radiating element is further configured to operate at one or more frequency bands at which wireless local area network signals are communicated so as to support, within the second single element, communication of wireless local area network signals.

15. The planar inverted-F antenna of claim 14, further comprising:

a second planar radiating element electrically connected to the first planar radiating element, the second planar radiating element formed as an L-shaped region and laterally spaced apart from the second region of the first planar radiating element, the second planar radiating element configured to operate at one or more frequency bands at which short-range wireless signals are communicated so as to support, within a second single element, communication of short-range wireless signals;

a second ground element electrically connected to a first area of the second planar radiating element; and a second feed element electrically connected to a second area of the second planar radiating element.

16. The planar inverted-F antenna of claim 15, wherein the second planar radiating element is further configured to operate at one or more frequency bands at which wireless local area network signals are communicated so as to support, within the second single element, communication of wireless local area network signals.

17. A planar inverted-F antenna, comprising:

a first planar radiating element including:

a first region, that is a substantially L-shaped region, a second region, that is a substantially L-shaped region inverted with respect to, and forming a continuation of, the first region, and a third region, that is a rectangular region that forms a continuation of the first region at a side of a lower portion of the first region, the first planar radiating element being a multi-band radiating element configured to operate at a plurality of frequency bands including at least one frequency band at which location signals are communicated and multiple frequency bands at which wireless broadband signals are communicated so as to support, within a single radiating element, communication of location signals and communication of wireless broadband signals;

a first feed element electrically connected to a first area of the first planar radiating element; and a first ground element electrically connected to a second area of the first planar radiating element, wherein the first area to which the first feed element is electrically connected is located in a first area of the first region, and wherein the second area to which the first ground element is electrically connected is located in a second area of the first region.

18. The planar inverted-F antenna of claim 17, wherein the third region intersects with an extension of a lower portion of the second region.

19. The planar inverted-F antenna of claim 17, wherein the location signals are communicated by a global positioning satellite system.

20. The planar inverted-F antenna of claim 17, wherein the wireless broadband signals are Long-Term Evolution (LTE) standard compliant signals.

* * * * *